US010727772B1

United States Patent
Jin et al.

(10) Patent No.: US 10,727,772 B1
(45) Date of Patent: Jul. 28, 2020

(54) PREDICTING AN INDUCTION MACHINE LOAD PATTERN

(71) Applicant: Rockwell Automation Technologies, Inc., Mayfield Heights, OH (US)

(72) Inventors: Lei Jin, Shanghai (CN); Robert J. Miklosovic, Chardon, OH (US); Zhendong Zhang, Mequon, WI (US); Timothy M. Rowan, Wauwatosa, WI (US); Haihui Lu, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/286,425

(22) Filed: Feb. 26, 2019

(51) Int. Cl.
*H02P 23/12* (2006.01)
*H02P 23/14* (2006.01)

(52) U.S. Cl.
CPC .......... *H02P 23/14* (2013.01); *H02P 23/12* (2013.01); *H02P 2205/05* (2013.01)

(58) Field of Classification Search
USPC ........................................................ 318/599
See application file for complete search history.

(56) References Cited

U.S. PATENT DOCUMENTS

| | | | | |
|---|---|---|---|---|
| 4,885,518 A | * | 12/1989 | Schauder | H02P 21/06 318/798 |
| 4,962,339 A | * | 10/1990 | Schauder | H02P 21/06 318/798 |
| 5,334,923 A | * | 8/1994 | Lorenz | H02P 6/187 318/805 |
| 7,023,166 B1 | * | 4/2006 | Kohen | H02P 21/12 318/727 |
| 7,552,100 B2 | | 6/2009 | Chen | |
| 2020/0007058 A1 | * | 1/2020 | Xu | H02P 21/18 |

OTHER PUBLICATIONS

Sung-Hyuk Cha, Comprehensive Survey on Distance/Similarity Measures between Probability Density Functions, International Journal of Mathematical Models and Methods in Applied Sciences Issue 4, vol. 1, 2007, pp. 300-3007.
P.E. Ozimek et al., "Dynamic Loss Minimizing Control of DBDTFC IM Drives using a Flux Command Look Ahead Fiter", 17th International Conference on Electrical Machines and Systems (ICEMS), Oct. 22-25, 2014, pp. 1-7.

(Continued)

*Primary Examiner* — Bentsu Ro
(74) *Attorney, Agent, or Firm* — Kunzler Bean & Adamson

(57) ABSTRACT

For predicting a load pattern, a method determines a torque error from a torque reference modified by a low pass filter function of the torque reference. The torque reference is one of measured from an induction machine energized by a flux current and a torque current and calculated in an induction machine controller. The method determines a torque increase pulse in response to a torque relative variation calculated from the torque error exceeding an increase threshold. In response to detecting the torque increase pulse, the method determines a change delay time from the torque relative variation and the torque increase pulse. The method further determines a change period from at least two torque increase pulses. The method increases the flux current before a change time that is predicted as a function of the change delay time and the change period.

20 Claims, 11 Drawing Sheets

(56) References Cited

OTHER PUBLICATIONS

Y. Shi et al., "New Developments in Loss Minimizing Control for Drives Without Compromising Torque Dynamics", IEEE Transactions on Industry Applications, Vol. 52, No. 6, Nov./Dec. 2016, pp. 5327-5335.

A. Reger et al., "Pattern Recognition in Load Profiles of Electric Drives in Manufacturing Plants", 5th International Electric Drives Production Conference (EDPC), Sep. 15-16, 2015, pp. 1-10.

* cited by examiner

PREDICTING AN INDUCTION MACHINE LOAD PATTERN

BACKGROUND INFORMATION

The subject matter disclosed herein relates to predicting a load pattern for an induction machine.

BRIEF DESCRIPTION

A method for predicting a load pattern is disclosed. The method determines a torque error from a torque reference modified by a low pass filter function of the torque reference. The torque reference is one of measured from an induction machine energized by a flux current and a torque current and calculated in an induction machine controller. The method determines a torque increase pulse in response to a torque relative variation calculated from the torque error exceeding an increase threshold. In response to detecting the torque increase pulse, the method determines a change delay time from the torque relative variation and the torque increase pulse. The method further determines a change period from at least two torque increase pulses. The method increases the flux current before a change time that is predicted as a function of the change delay time and the change period.

An apparatus for predicting a load pattern is also disclosed. The apparatus includes a plurality of semiconductor gates that determine a torque error from a torque reference modified by a low pass filter function of the torque reference. The torque reference is one of measured from an induction machine energized by a flux current and a torque current and calculated in an induction machine controller. The apparatus determines a torque increase pulse in response to a torque relative variation calculated from the torque error exceeding an increase threshold. In response to detecting the torque increase pulse, the apparatus determines a change delay time from the torque relative variation and the torque increase pulse. The apparatus determines a change period from at least two torque increase pulses. The apparatus increases the flux current before a change time that is predicted as a function of the change delay time and the change period.

A system for predicting a load pattern is disclosed. The system includes an induction machine and an induction machine controller. The induction machine produces a torque. The induction machine controller determines a torque error from a torque reference modified by a low pass filter function of the torque reference, wherein the torque reference is one of measured from the induction machine energized by a flux current and a torque current and calculated by the induction machine controller. The induction machine controller further determines a torque increase pulse in response to a torque relative variation calculated from the torque error exceeding an increase threshold. In response to detecting the torque increase pulse, the induction machine controller determines a change delay time from the torque relative variation and the torque increase pulse. The induction machine controller determines a change period from at least two torque increase pulses. The induction machine controller increases the flux current before a change time that is predicted as a function of the change delay time and the change period.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
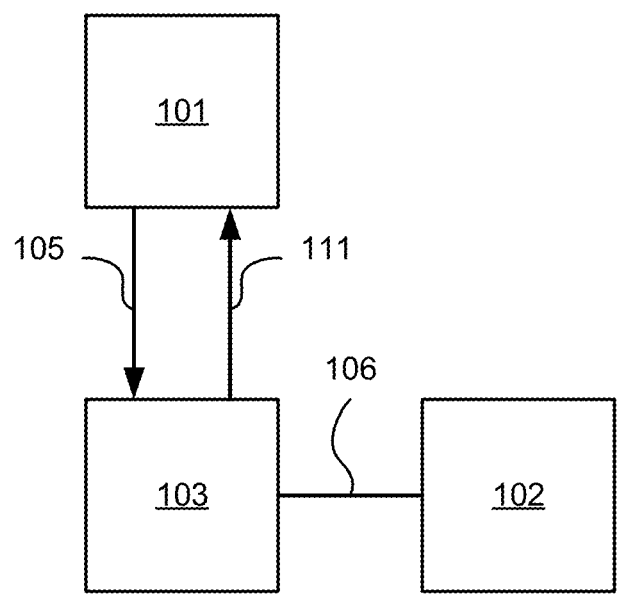
FIG. 1A is a schematic block diagram of an induction machine control system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Java, JavaScript, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic block diagram of an induction machine control system 100. In the depicted embodiment, the system 100 includes an induction machine controller 101 and an induction machine 103. The system 100 may provide a controlled torque 106 from the induction machine 103 to a load 102 in response to a flux current command 105. The flux current command 105 may be generated as a function of a torque reference 111. The induction machine 103 may be an induction motor, an asynchronous motor, or the like.

The load 102 may change, requiring a change in the torque 106. When changes in the load 102 are frequent and sharp, providing the torque 106 may result in overcurrent conditions and significant inefficiencies in power consumption.

The embodiments described herein detect a change in the load 102. The embodiments further predict changes in the load pattern of the load 102 by determining a change delay time and a change period as will be described hereafter. The changes in the load pattern may be predicted based on the rotor time constant of the induction machine 103. The changes in the load pattern may be continuously detected. In addition, the embodiments may increase a flux current of the induction machine 103 ahead of a change time that is predicted from the change period so that the desired torque 106 is supplied with increased efficiency.

Figure 1B:
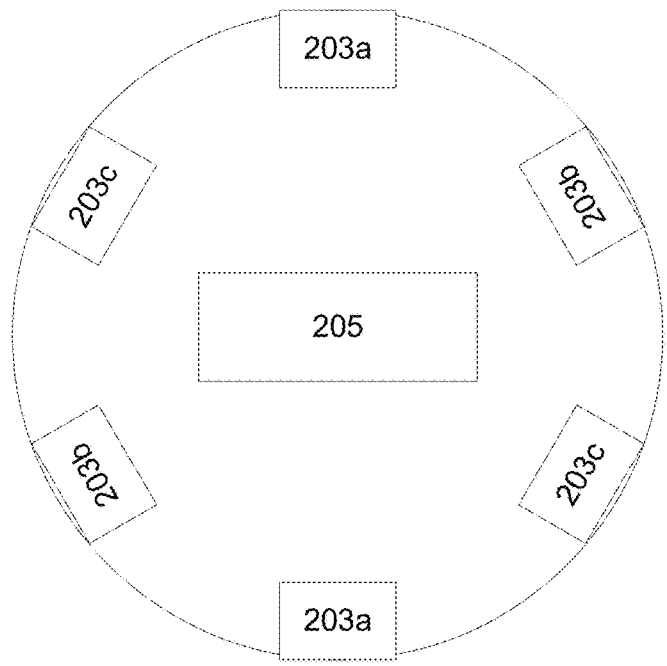
FIG. 1B is a schematic diagram of an induction machine according to an embodiment.

FIG. 1B is a schematic diagram of the induction machine 103. In the depicted embodiment, the induction machine 103 includes a rotor 205 and a plurality of windings 203. Three-phase windings 203 are shown with first windings 203a, second windings 203b, and third windings 203c. The windings 203 may be energized with a flux current in order to generate a net magnetic field that applies a torque relative to a magnetic field of the rotor 205. The rotor 205 may include windings that are energized by a torque current 209 to generate the magnetic field. The induction machine 103 is shown with two poles and three-phase windings 203, but any number of poles and windings 203 may be employed.

Figure 1C:
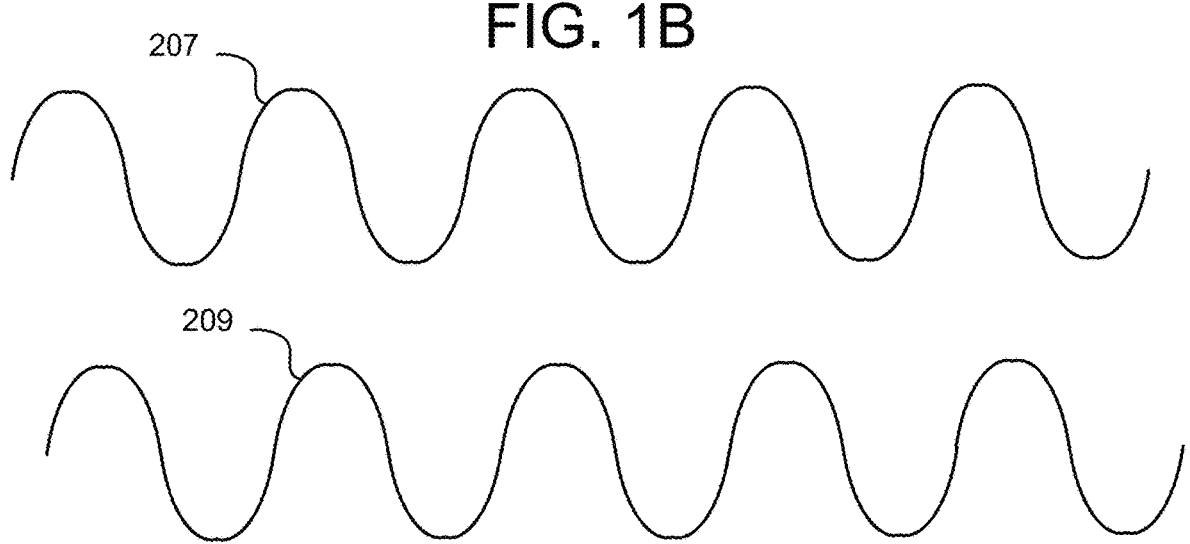
FIG. 1C is a drawing of a flux current and a torque current according to an embodiment.

FIG. 1C is a drawing of the flux current 207 and the torque current 209. The flux current 207 may be out of phase with the torque current 209 in order to motivate the rotor 205 and generate the torque 106.

Figure 1D:
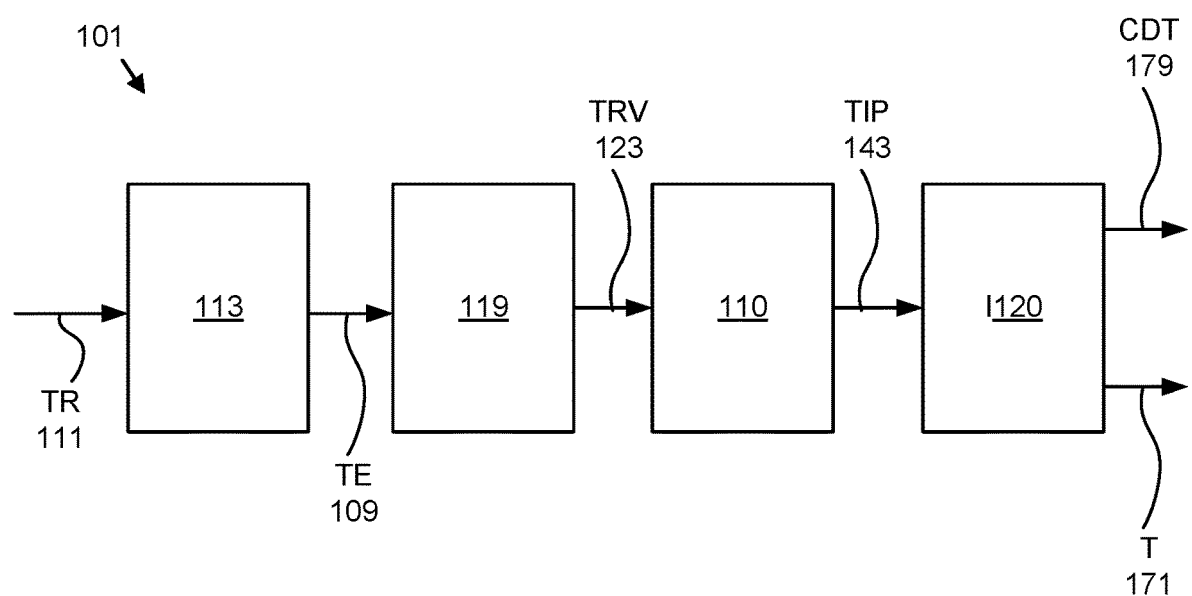
FIG. 1D is a schematic block diagram of an induction machine controller according to an embodiment.

FIG. 1D is a schematic block diagram of the induction machine controller 101. In the depicted embodiment, the controller 101 includes a low-pass filter function (LPF) 113, and integrator 119, a threshold test 110, and an interval calculator 120. The LPF 113 receives a torque reference 111. The torque reference 111 may be measured from the induction machine 103. In one embodiment, the torque reference 111 is determined as a function of the flux current 207. In addition, the torque reference 111 may be calculated as an estimate by the controller 101.

The LPF 113 may determine a torque error 109 from the torque reference 111. A time constant of the LPF 113 is based on the rotor time constant of the rotor 205. As a result, the torque error 109 is significantly different from the torque reference 111 when the load 102 changes but substantially the same as the torque reference 111. As used here in significantly different is a difference of greater than 10 percent and substantially the same is a difference of less than 2 percent.

The integrator 119 may calculate a torque relative variation 123 from the torque error 109. The threshold test 110 may determine if the torque relative variation 123 exceeds an increase threshold. If the torque relative variation 123 exceeds the increase threshold, the threshold test 110 may determine a torque increase pulse 143.

The interval calculator 120 may determine a change delay time 179 in response to detecting the torque increase pulse 143. The change delay time 179 may be determined as a function of the torque relative variation 123 and the torque increase pulse 143. The interval calculator 120 may further determine a change period 171 from at least two torque increase pulses 143. In one embodiment, the flux current 207 is increased ahead of a change time that is predicted as a function of the change delay time 179 and the change period 171 as will be described hereafter.

Figure 2A:
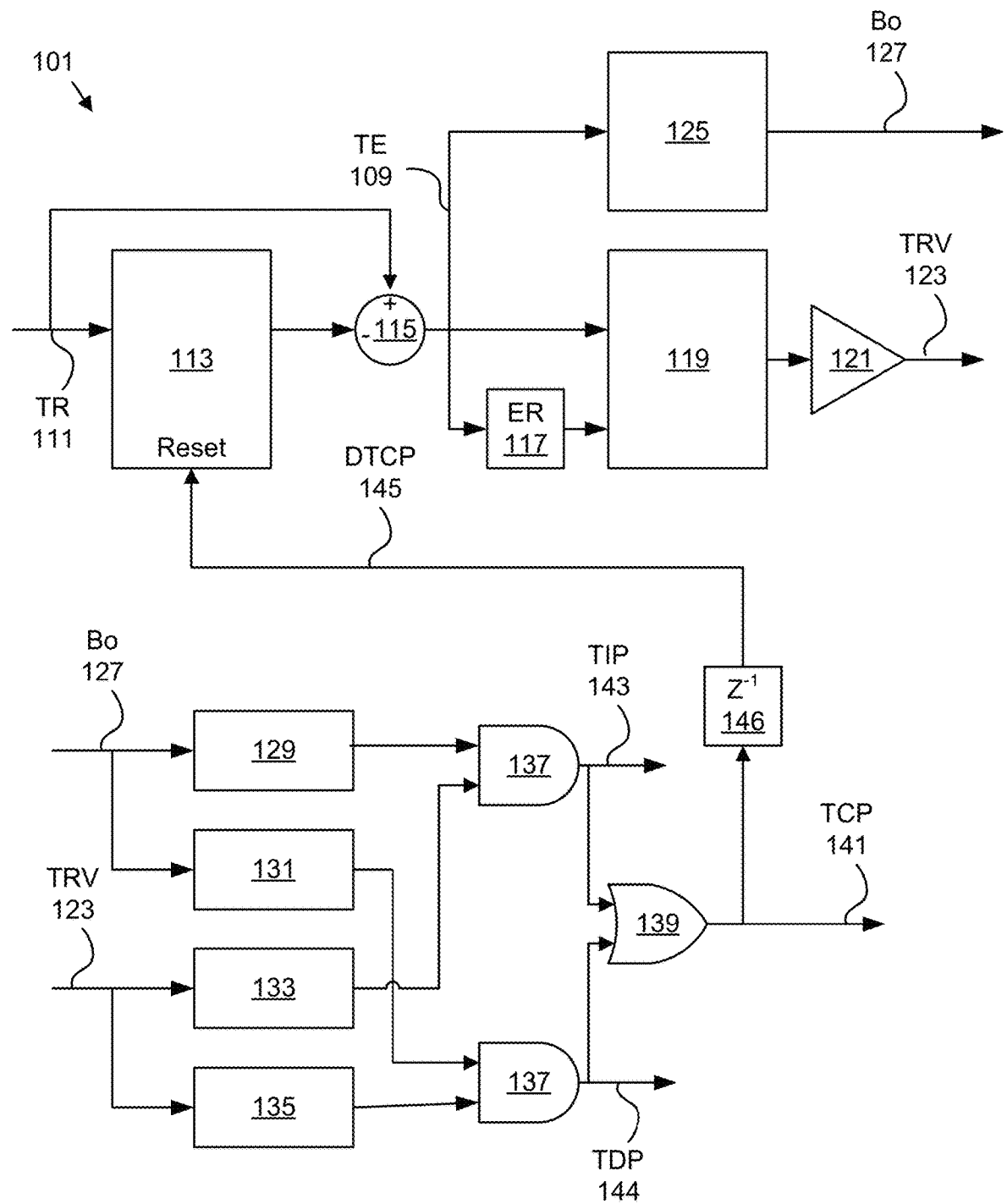
FIGS. 2A-B are schematic block diagrams of an induction machine controller according to an embodiment.
Figure 2B:
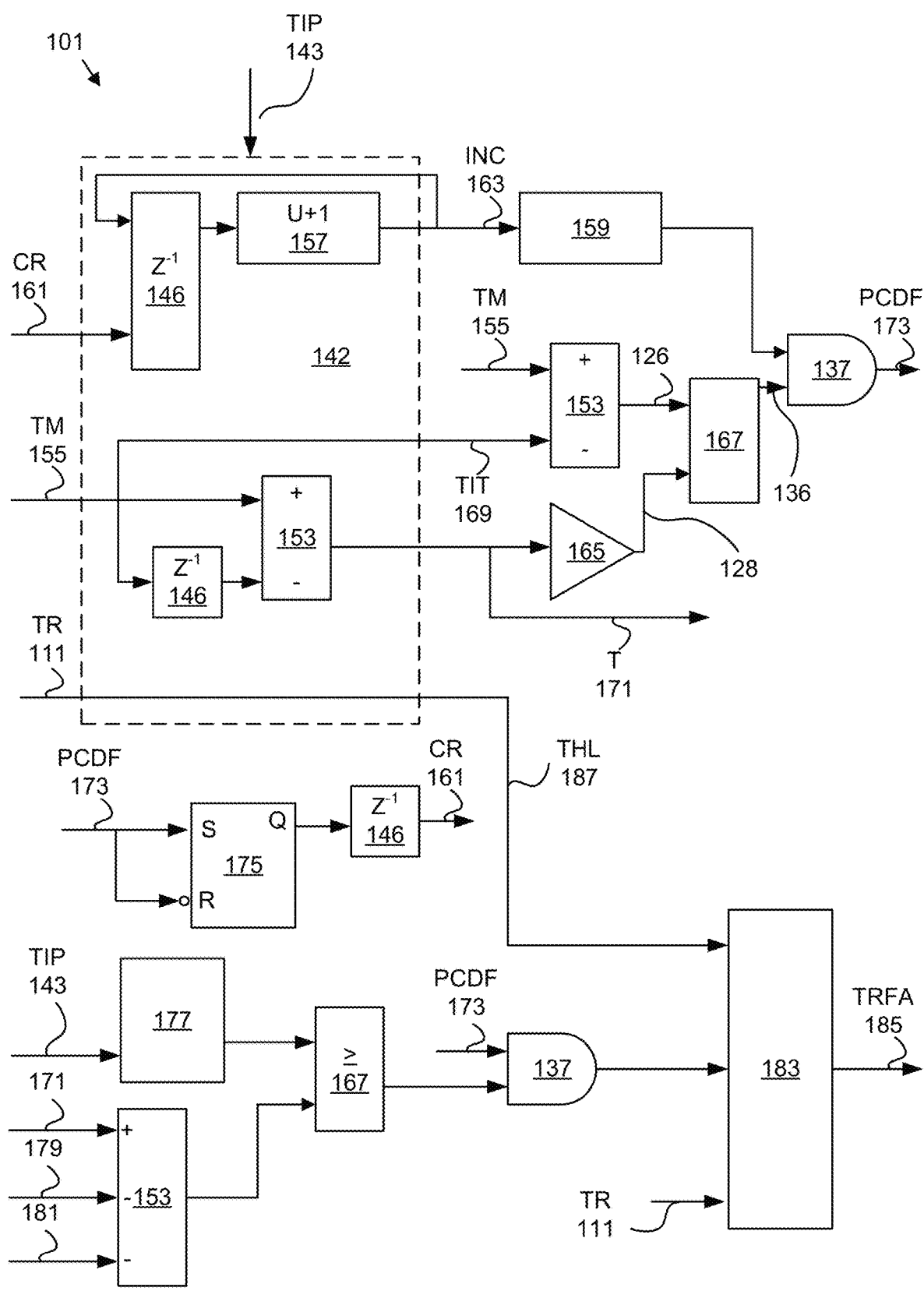

FIGS. 2A-B are schematic block diagrams of the induction machine controller 101. The functions of the controller 101 may be implemented by semiconductor gates, a processor executed code, or combinations thereof. In the depicted embodiment, the torque reference 111 is received at the LPF 113. The LPF 113 generates the torque error 109 from the torque reference 111. In one embodiment, the torque error 109 is the torque reference 111 modified by the result of the LPF 113 on the torque reference 111. In the depicted embodiment, the result of the LPF 113 on the torque reference 111 is subtracted from the torque reference 111 to determine the torque error 109. The LPF 113 may implement the function of Equation 1, where s is a frequency transform, $\tau_r$ is a rotor time constant, and k is a nonzero constant such as one.

$$LPF = \frac{k}{1 + s * \tau_r} \quad \text{Equation 1}$$

Because the time constant of the LPF 113 is the rotor time constant, the torque error 109 is small when the load 102 is constant. However, when the load 102 changes suddenly, the torque error 109 is large.

The torque error 109 is received by an error function 117. In response to the magnitude of the torque error 109 being less than an error threshold, the error function 117 resets the integral of the torque error 109 from the integrator 119 to an initial value. In one embodiment, the integrator 119 is reset to zero. The error threshold may be in the range of 0.05 to 2.0 percent. In a certain embodiment, the error threshold is 0.1 percent. As a result, while the torque error 109 is small, the torque relative variation 123 from the integrator 119 is also small. In one embodiment, the torque relative variation 123 is multiplied by a constant gain 121. In one embodiment, the constant gain 121 is a reciprocal of the rotor time constant $1/\tau_r$.

In one embodiment, a backlash detector 125 receives the torque error 109. The backlash detector 125 may detect a turning corner of the torque reference 111. An upward turning corner of torque reference 111 is detected in response to a falling edge of the backlash output 127 of the backlash detector 125. A downward turning corner of torque reference 111 is detected in response to a rising edge of the backlash output 127.

In one embodiment, the backlash output 127 is received by a falling edge detector 129 and a rising edge detector 131. The falling edge detector 129 generates an asserted output in response to a falling edge of the backlash output 127. The rising edge detector 131 generates an asserted output in response to a rising edge of the backlash output 127.

The torque relative variation 123 is further received by an increase change detector 133 and a decrease change detector 135. The increase change detector 133 may generate an asserted output in response to detecting a change in the torque relative variation 123 of greater than an increase threshold. The increase threshold may be in the range of 10 percent to 40 percent. In one embodiment, the increase threshold is 30 percent. The decrease change detector 135 may generate an asserted output in response to a change in the torque relative variation 123 of less than a decrease threshold. The decrease threshold may be in the range of −10 percent to −40 percent. In one embodiment, the decrease threshold is −30 percent. The increase threshold may be equal to the decrease threshold. Alternatively, the increase threshold may not be equal to the decrease threshold.

One or more AND gates/functions 137 and OR gates/functions 139 may generate a torque increase pulse 143, a torque change pulse 141, and/or a torque decrease pulse 144. In the depicted embodiment, the torque change pulse 141 is determined in response to detecting a turning corner of the torque reference 111 at the falling edge detector 129 and the torque relative variation 123 exceeding the increase threshold or detecting a turning corner of the torque reference 111 at the rising edge detector 131 and the torque relative variation 123 exceeding the decrease threshold. The torque increase pulse 143 may be determined in response to the torque relative variation 123 exceeding the increase threshold and/or detecting an upward turning corner of the torque reference 111 at the following edge detector 129. The torque decrease pulse 144 may be determined in response to detecting a downward turning corner of the torque reference 111 at the rising edge detector 131 and/or the torque relative variation 123 being less than the decrease threshold.

In one embodiment, the torque change pulse 141 is determined in response to one of the torque increase pulse 143 and the torque decrease pulse 144 being determined. The torque increase pulse 143 may be determined in response to both the torque relative variation 123 exceeding the increase threshold and detecting an upward turning corner of the torque reference 111 at the following edge detector 129. In a certain embodiment, the torque decrease pulse 144 is determined in response to both the torque relative variation 123 being less than the decrease threshold and detecting a downward turning corner of the torque reference 111.

In one embodiment, the torque change pulse 141 is delayed by a delay function 146. The delayed torque change pulse 145 may reset the integral inside LPF 113 to the torque reference 111. In one embodiment, when the torque change pulse 141 is generated, output of LPF 113 is set to the torque reference 111.

Turning now to FIG. 2B, a trigger subsystem 142 receives the torque increase pulse 143. The torque increase pulse increments a counter 157. The counter 157 may be reset by a counter reset 161. The generation of the counter reset 161 is described hereafter. In one embodiment, the counter reset 161 is delayed by a delay function 146. In the depicted embodiment, an increase pulse count 163 is a sum of the torque increase pulse 143 and a delayed increase pulse count 163. Other algorithms for counting the torque increase pulses 143 may be employed. A count test 159 determines if the increase pulse count 163 is greater than or equal a count threshold. The count threshold determines how many torque increase pulses 143 are received before determining that changes to the load 102 are cyclical. In one embodiment, the count threshold is 2. In an alternate embodiment, the count threshold is 3.

A timer 155 is further received by the trigger subsystem 142. The timer 155 may be delayed by a delay function 146 that is triggered by the torque increase pulse 143. The delayed timer 155 is subtracted from the timer 155 to generate the change period 171. In addition, the change period 171 may be determined to be the time interval between torque increase pulses 143.

A torque increase timer 169 generated as a function of the timer 155 is further subtracted from the timer 155 by an adder 153, generating a torque increase appearance interval 126 that indicates a time interval from a last torque increase pulse 143. The torque increase appearance interval 126 may be compared by comparator 167 with the change period 171, generating period expired 136. Period expired 136 indicates that the change period 171 has expired since the last torque increase pulse 143.

In one embodiment, period expired 136 is compared with the change period 171 multiplied by a constant gain 165 to determine a set time length 128. The constant gain 165 may be in the range of 1.2 to 3. In a certain embodiment, the constant gain 165 is 1.5. In one embodiment, if the torque increase appearance interval 126 is less than the set time length 128, and the increase pulse count 163 is greater than the count threshold, a pattern calculation done flag 173 is asserted indicating that the pattern of the change period 171 has been calculated as a valid pattern.

In one embodiment, the trigger subsystem 142 further generates the torque high-level 187. The torque high-level 187 may be a maximum value of the torque reference 111 as shown hereafter in FIG. 3B.

In one embodiment, the pattern calculation done flag 173 is latched by a latch 175. The latched pattern calculation done flag 173 is delayed by a delay function 146 to generate the counter reset 161. Thus the counter 157 is reset as a function of the pattern calculation done flag 173. In one embodiment, the pattern calculation done flag 173 remains asserted until after the torque change pulse 141 is not detected for the change period 171 and/or the set time length 128 as will be shown hereafter in FIG. 6.

In one embodiment, a second timer 177 is reset by each torque increase pulse 143. The second timer 165 is compared by comparator 167 against the change period 171 minus a change delay time $t_d$ 179 minus a lookahead time 181. The change delay time 179 and lookahead time 181 are described hereafter in FIG. 3B. Thus if the second timer 167 exceeds the change period 171 minus the change delay time 179 minus the lookahead time 181 and the pattern calculation done flag 173 is asserted, the torque high-level 187 is selected for a torque reference for flux current adjustment TFRA 185. The flux current commend 105 may be a function of the torque reference for flux current adjustment TFRA 185. In one embodiment, the flux current commend 105 is a linear function of the torque reference for flux current adjustment TFRA 185. The torque reference for flux current adjustment 185 is a function of the torque high-level 187 instead of a function of the torque reference 111 to increase the flux current 209 before a change time that is predicted as a function of the change delay time 179 and the change period 171.

If the second timer 167 does not exceed the change period 171 minus the change delay time 179 minus the lookahead time 181 or the pattern calculation done flag 173 is not asserted, the torque reference 111 is selected as the torque reference for flux current adjustment 185. Thus, the flux current 207 will be driven by the flux current command 105 as a function of the torque reference 111.

Figure 3A:
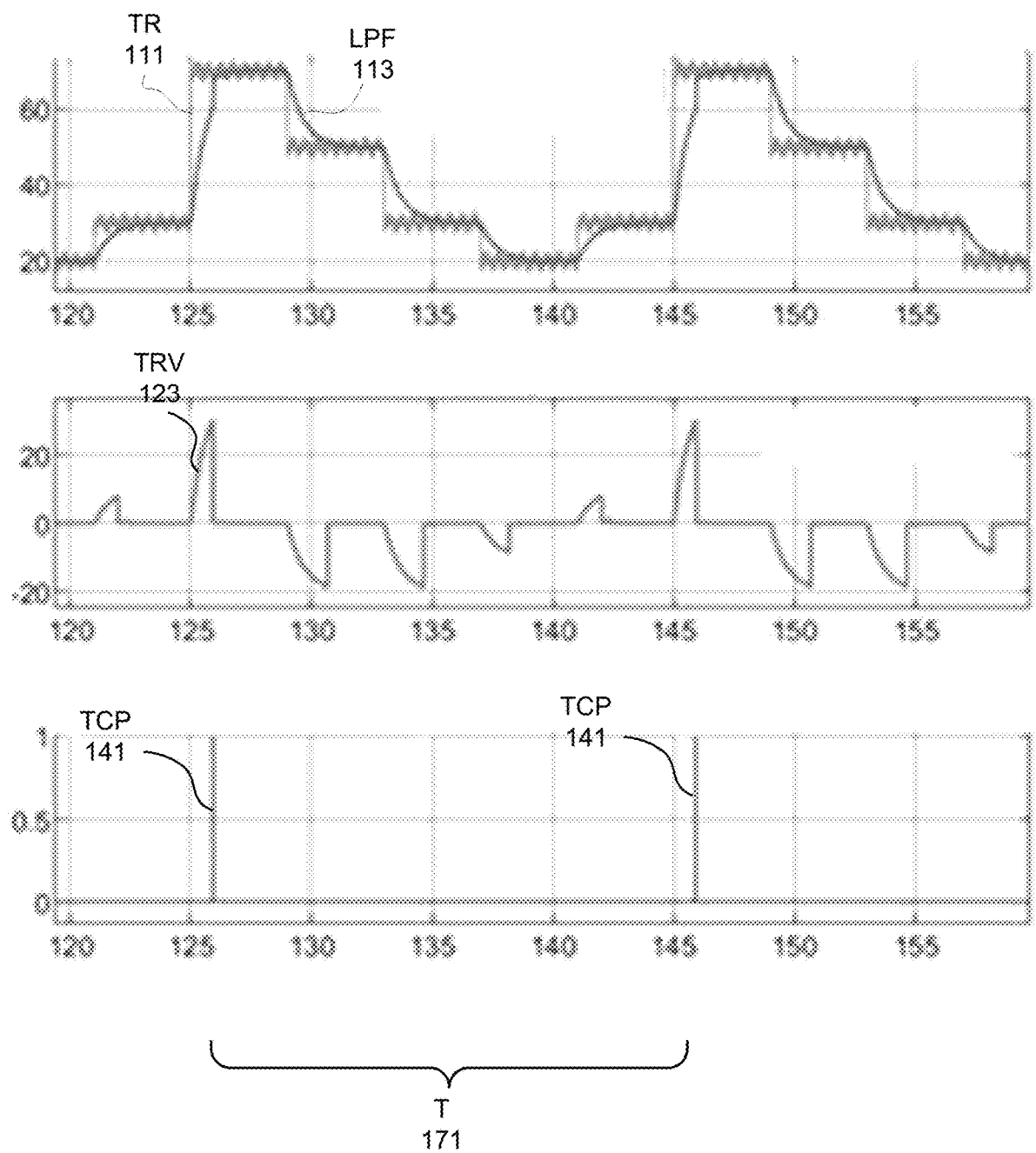
FIG. 3A is graphs of a torque reference, low pass filter function, torque relative variation, and torque change pulse according to an embodiment.

FIG. 3A is graphs of the torque reference 111, LPF 113, torque relative variation 123, and torque change pulse 141. In the depicted embodiment, significant differences between the torque reference 111 and the LPF 113 generate a large torque error 109. The torque relative variation 123 increases sharply as a function of the torque error 109. In response to the torque relative variation 123 exceeding the increase threshold, the controller 101 determines a torque increase pulse 143. In the depicted embodiment, the determination of two torque increase pulses 143 is used to determine the change period 171.

Figure 3B:
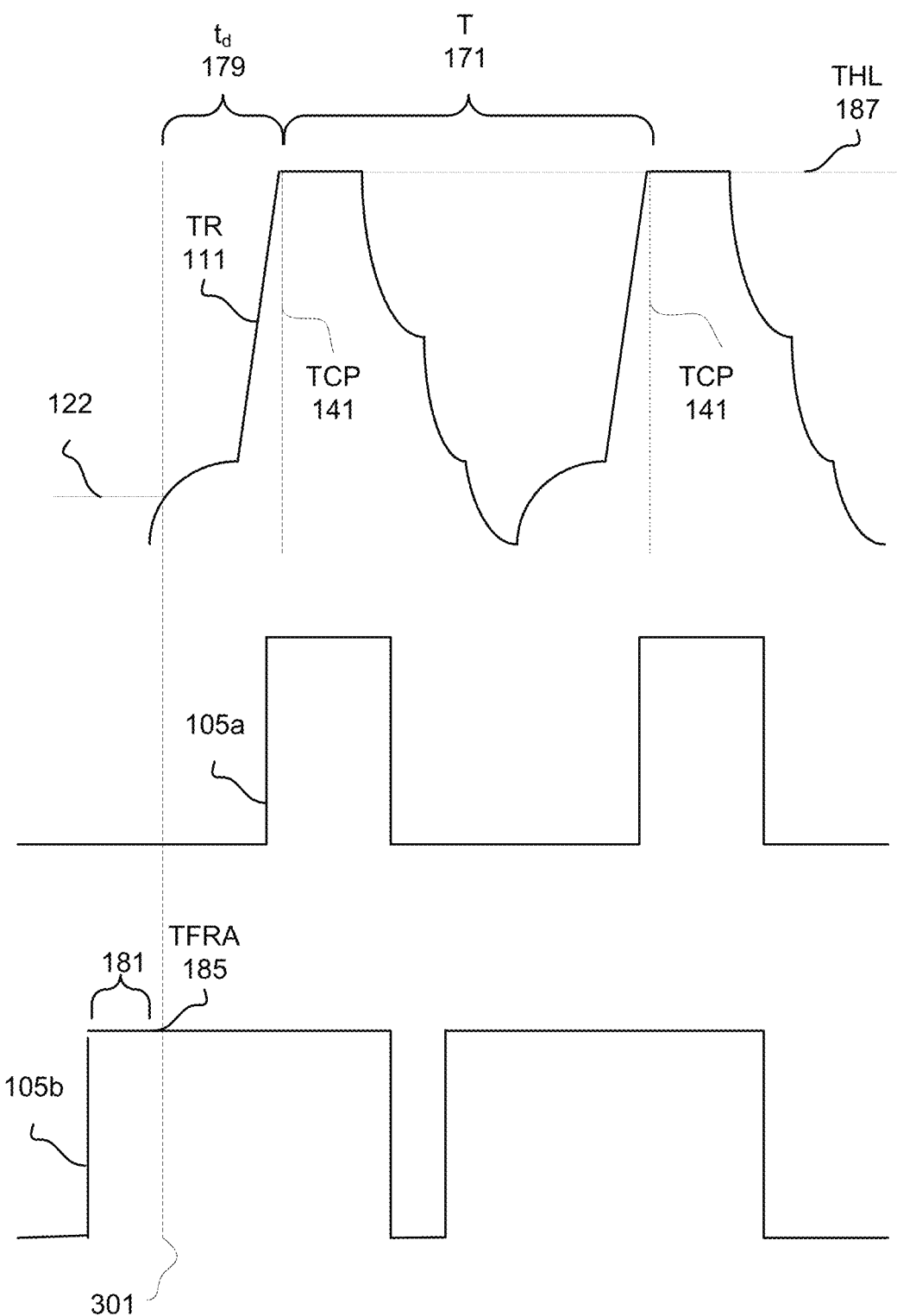
FIG. 3B is graphs illustrating the change delay time and the change period according to an embodiment.

FIG. 3B is graphs illustrating the change delay time 179 and the change period 171. The change delay time 179 and the change period 171 are shown relative to the torque reference 111 and the resulting torque change pulse 141. The torque high-level 187 is further shown relative to the torque reference 111. The change delay time 179 may be in interval from the torque reference 111 being equal to a low level 122 to the torque reference being equal to the torque high-level 187. The change period 171 may be a time interval from the torque reference 111 being equal to the torque high-level 187 to the torque reference 111 again being equal to the torque high-level 187.

In the depicted embodiment, a first flux current command 105a that would be generated as a function of only the torque reference 111 is shown. In addition, a second flux current command 105b is shown that increases the flux current 209 before the change time 301 that is predicted as a function of the change delay time 181 and the change period 171. In the depicted embodiment, the flux current 207 is increased by a lookahead time 181 ahead of the change time 301. Because the second flux current command 105b increases the flux current 207, the induction machine 103 efficiently supplies the needed torque 106 when the load 102 increases cyclically as predicted by the embodiments.

Figure 4:
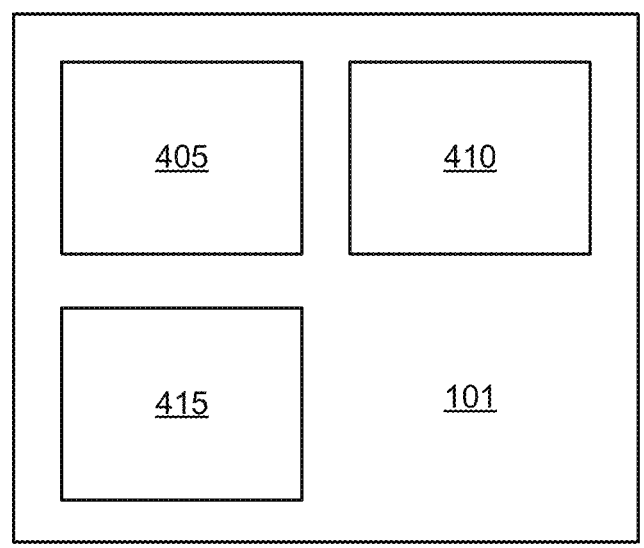
FIG. 4 is a schematic block diagram of an induction machine controller according to an embodiment.

FIG. 4 is a schematic block diagram of an induction machine controller 101. In the depicted embodiment, the controller 101 comprises semiconductor gates organized as a processor 405, a memory 410, and communication hardware 415. The memory 410 may store code. The processor 405 may execute the code. The communication hardware 415 may receive inputs such as the torque reference 111 and generate outputs such as the flux current command 105.

Figure 5A:
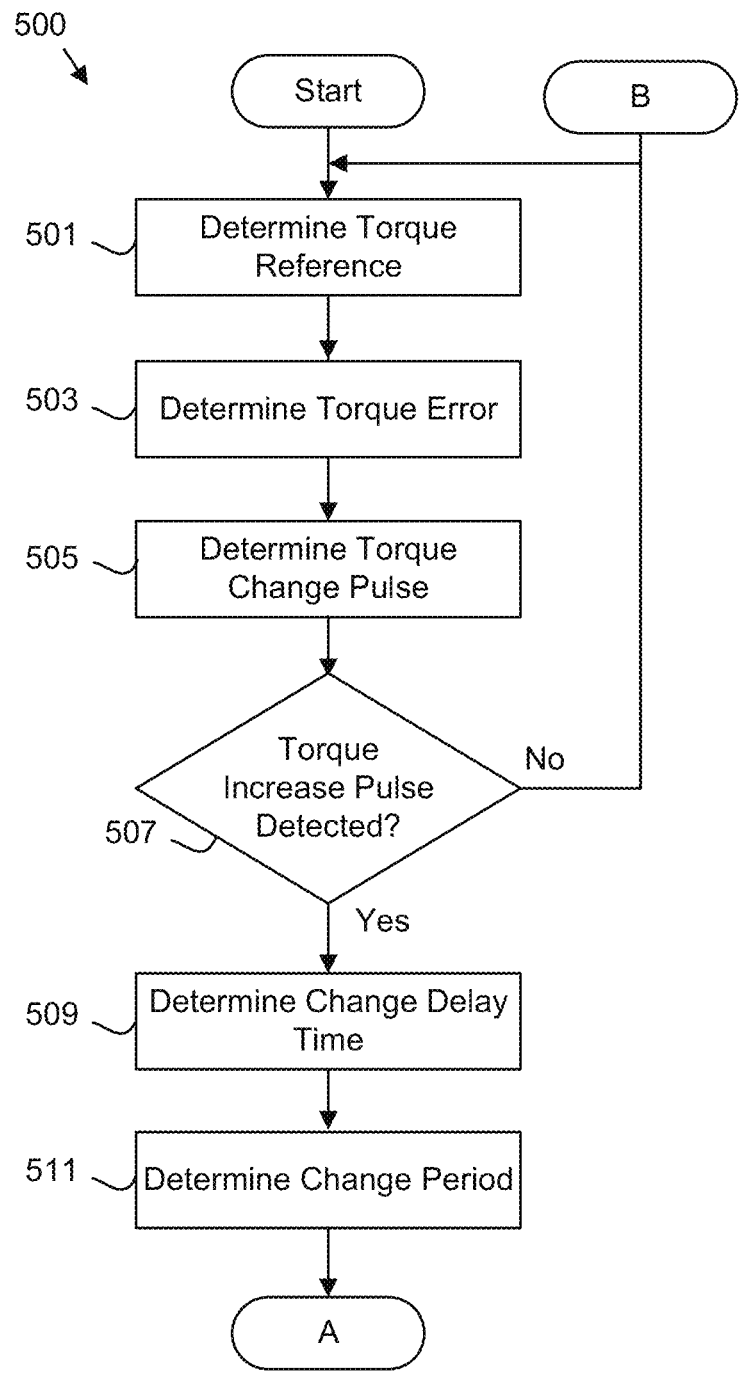
FIGS. 5A-B are schematic flow chart diagram of a change period prediction method according to an embodiment.
Figure 5B:
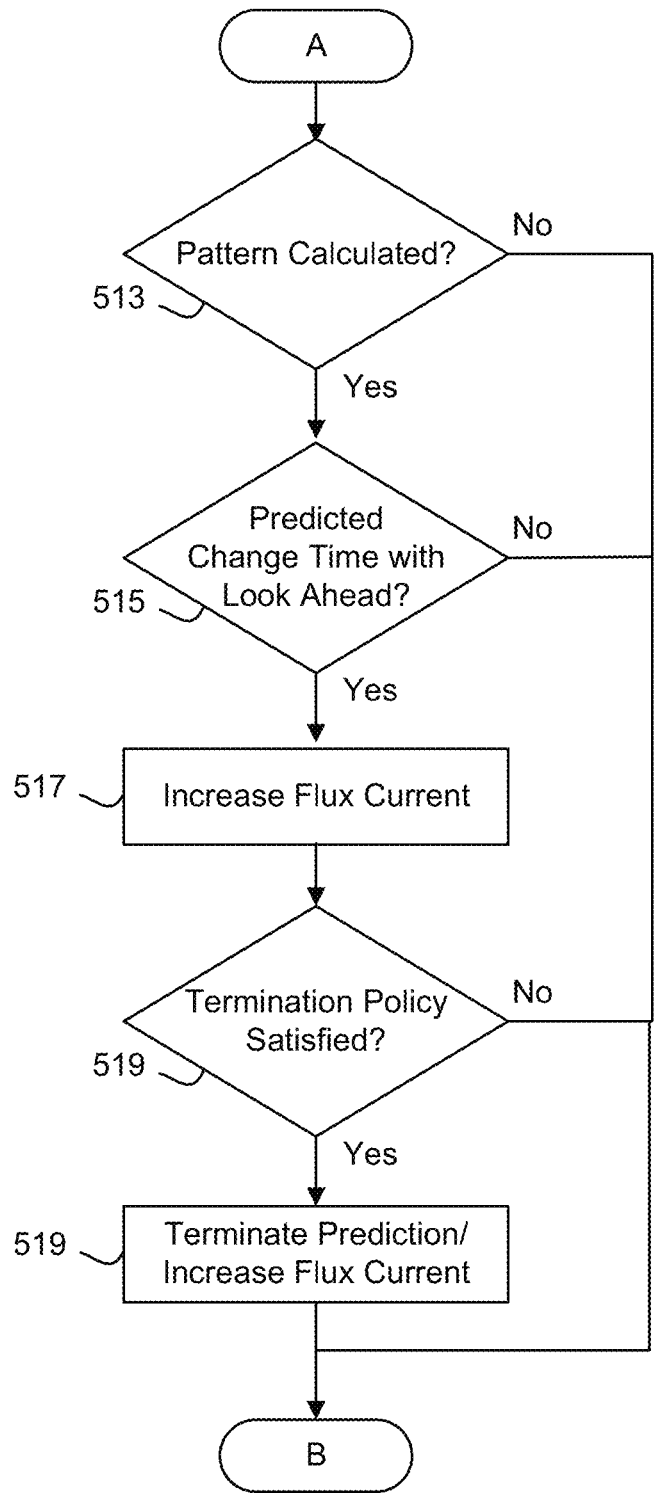

FIGS. 5A-B are schematic flow chart diagram of a change period prediction method 500. The method 500 may predict a load pattern of the induction machine 101, including predicting the change period 171 and/or changed delay time for a cyclic variation in the load 102. The method 500 may further increase the flux current 207 ahead of the change time 301. The method 500 may be performed by the controller 101.

The method 500 starts, and in one embodiment, the controller 101 determines 501 the torque reference 111. The torque reference 111 may be one of measured from the induction machine 103 and calculated by the controller 101. The torque reference 111 may be determined 501 by measuring a speed control loop for the induction motor 103. In one embodiment, the speed control loop is measured when the induction machine 103 is running in a constant-speed mode. The speed control loop may be substantially the same as the torque 106. In addition, the controller 101 may estimate the torque reference 111. In a certain embodiment, the torque reference 111 is substantially the same as the torque 106 measured with a torque meter. The torque reference 111 may be stored in the memory 410.

The controller 101 may determine 503 the torque error 109. The torque error TE 109 may be determined 503 as shown in FIG. 2A. In addition, the torque error TE 109 may be calculated using Equation 2 as a function of the torque reference TR 111.

$$TE = TR\left(1 - \frac{k}{1 + s * \tau_r}\right)$$ Equation 2

The controller 101 may determine 505 the torque change pulse 141. The torque change pulse 141 may be determined 505 as shown in FIG. 2A. In addition, the torque change pulse 141 may be determined 505 in response to detecting a turning corner of the torque reference 111. In one embodiment, the torque change pulse 141 is determined in response to one of the torque increase pulse 143 and the torque decrease pulse 144 being determined. The torque increase pulse 143 may be determined in response to both the torque relative variation 123 exceeding the increase threshold and detecting an upward turning corner of the torque reference 111 at the following edge detector 129. In a certain embodiment, the torque decrease pulse 144 is determined in response to both the torque relative variation 123 being less than the decrease threshold and detecting a downward turning corner of the torque reference 111. In one embodiment, the LPF function 113 is reset to the torque reference 111 by the delayed torque change pulse 145, resulting in a torque error 109 equal to zero.

The controller 101 may determine 507 if a torque increase pulse 143 is detected. The torque increase pulse 143 may be detected 507 in response to both an upward turning corner of torque reference 111 and detecting a change in the torque relative variation 123 of greater than an increase threshold. Alternatively, torque increase pulse 143 may be detected 507 in response to the upward turning corner of torque reference 111. In a certain embodiment, the torque increase pulse 143 may be detected 507 in response to change in the torque relative variation 123 of greater than the increase threshold. If the torque increase pulse 143 is not detected, the controller 101 loops to determine 501 the torque reference 111.

If the torque increase pulse 143 is detected, the controller 101 determines 509 the change delay time 179. The change delay time 179 may be a time interval from the torque reference 111 being equal to a low level 122 to the torque reference 111 being equal to the torque high-level 187 as shown in FIG. 3B.

The controller 101 further determines 511 the change period 171. The change period 171 may be the time interval from the torque reference 111 equal to the torque high-level 187 to the torque reference 111 again being first equal to the torque high-level 187 as shown in FIG. 3B. In one embodiment, the change time 301 is calculated as the change period 171 plus the change delay time 179. The change time 301 may be a predicted change time 301.

Turning to FIG. 5B, the controller 101 determines 513 if a pattern of torque increase pulses 143 is calculated. The pattern may be calculated is if the pattern calculation done flag 173 of FIG. 2B is asserted. In addition, the pattern may be calculated if both the increase pulse count 163 is greater than or equal to the count threshold and the torque increase appearance interval 126 is less than the set time length 128. If the pattern is not calculated, the controller 101 loops to determine 501 the torque reference 111.

If the pattern is calculated, the controller 101 determines 515 if the predicted change time 301 plus the look ahead time 181 is arrived. If the predicted change time 301 plus the look ahead time 181 has not arrived, the controller 101 loops to determine 501 the torque reference 111.

If the predicted change time 301 plus the look ahead time 181 has arrived, the controller 101 increases the flux current 207. The flux current 207 may be increased by advancing the flux current command 105. The flux current 207 may be increased before the change time 301. In one embodiment, the flux current 207 is increased to the torque reference for flux current adjustment 185 at the look ahead time 181.

The controller 101 may further determine 519 if a termination policy is satisfied. The termination policy may be satisfied in response to the torque increase pulse 143 not appearing during the set time length 128. If the termination policy is not satisfied, the controller 101 loops to determine 501 the torque reference 111.

If the termination policy is satisfied, the controller 101 may terminate 519 predicting the change time 301. In addition, the controller 101 may terminate 519 increasing the flux current 207 and the controller 101 loops to determine 501 the torque reference 111.

Figure 6:
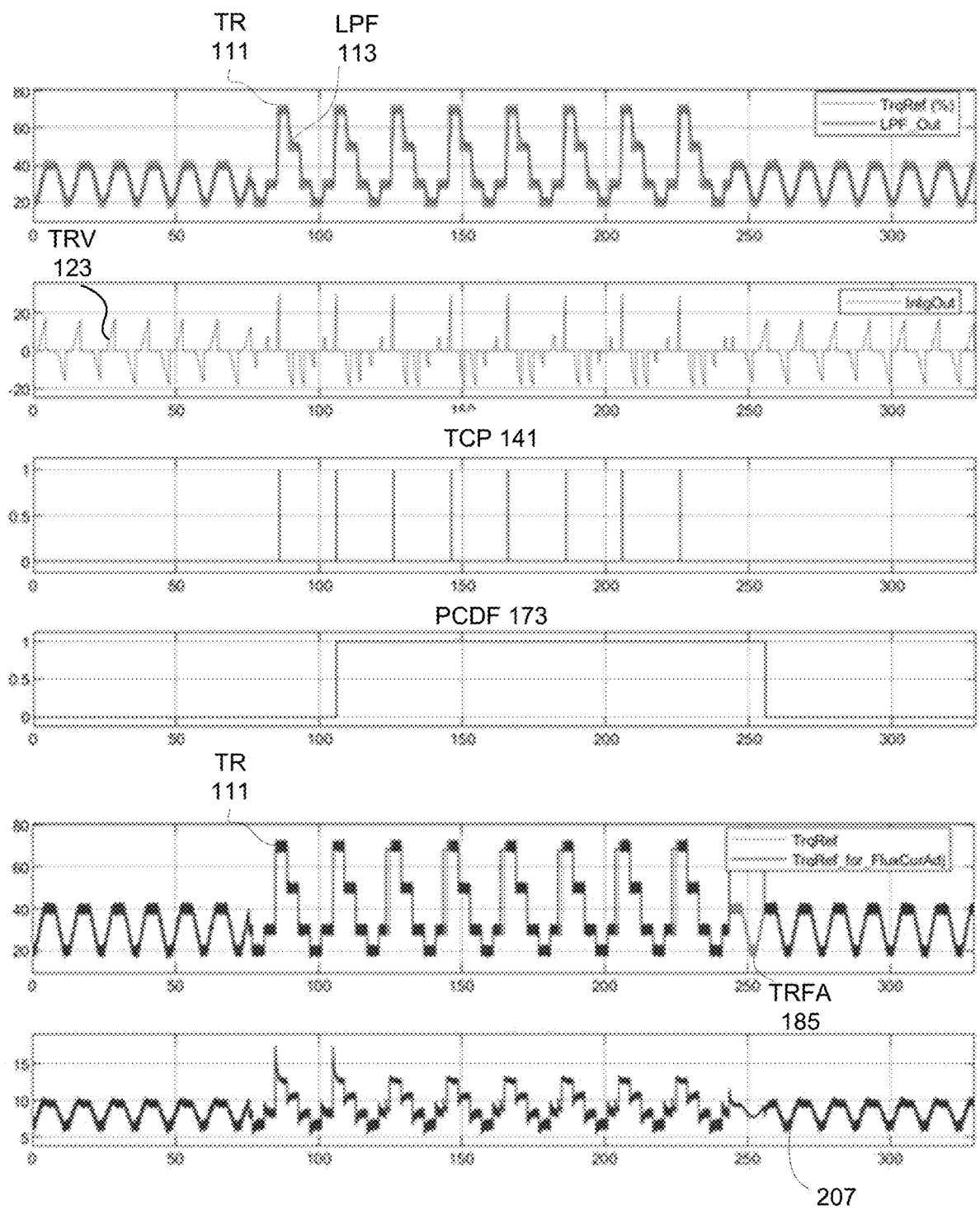
FIG. 6 is graphs of a torque reference, low pass filter function, torque relative variation, torque change pulse, pattern calculation done flag, torque reference for flux current adjustment, and a magnitude of flux current according to an embodiment.

FIG. 6 is graphs of the torque reference 111, LPF 113, torque relative variation 123, torque change pulse 141, pattern calculation done flag 173, torque reference for flux current adjustment TFRA 185, and a magnitude of flux current 207 during a period of over 300 seconds along the horizontal axis.

The torque reference 111 is approximately equal to the LPF 113 until about 80 seconds, when the torque reference 111 diverges from the LPF 113 generating a larger torque error 109 and as a result a larger torque relative variation 123 that exceeds the increase threshold. The torque relative variation 123 exceeding the increase threshold generates a plurality of torque change pulses 141.

Between 80 seconds and 120 seconds, the flux current 207 spikes, indicative of energy inefficient operation of the induction machine 103. In response to a second torque change pulse 141 at approximately 110 seconds, the pattern calculation done flag 173 is asserted for a count threshold of 2. During subsequent cycles, the flux current 207 is increased before the change time 301 as the torque reference for flux current adjustment TFRA 185 is equal to the torque high-level 187. As a result, the flux current 207 does not spike, indicative of energy efficient operation.

After about 225 seconds, the torque reference 111 is again approximately equal to the LPF 113, resulting in a small torque error 109 and a small torque relative variation 123 that does not exceed the increase threshold. Therefore, no subsequent torque change pulses 141 are determined and the pattern calculation done flag 173 is deasserted after the set time length 128. Before the pattern calculation done flag 173 is deasserted, the torque reference 111 diverges from the torque reference for flux current adjustment TFRA 185 between 240 seconds and 260 seconds as the torque reference for flux current adjustment TFRA 185 is still the torque high-level 187. In response to the pattern calculation flag 173 being deasserted, the torque reference for flux current adjustment TFRA 185 again is the torque reference 111.

Problem/Solution

Rapid changes in the load 102 of an induction machine 103 cause high power loss as the flux current 207 is significantly increased to supply the torque 106 required for the load 102. For example, a rapid change may be a 50 percent per unit (pu) change in one second or less. The embodiments determine a change delay time 181 and change period 171 and increase the flux current 207 before a change time 301 that is predicted as a function of the change delay time 181 and the change period 171. As a result, increased torque 106 is supplied to the load without a spike in flux current 207, improving the efficiency of the induction machine 103.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   determining, by use of a processor, a torque error from a torque reference modified by a low pass filter function (LPF) of the torque reference, wherein the torque reference is one of measured from an induction machine energized by a flux current and a torque current and calculated in an induction machine controller;
   determining a torque increase pulse in response to a torque relative variation calculated from the torque error exceeding an increase threshold;
   in response to detecting the torque increase pulse, determining a change delay time from the torque relative variation and the torque increase pulse;
   determining a change period from at least two torque increase pulses; and
   increasing the flux current before a change time that is predicted as a function of the change delay time and the change period.

2. The method of claim 1, wherein the flux current is increased by advancing a flux current command.

3. The method of claim 1, wherein the LPF 113 implements the transform $$LPF = \frac{k}{1+s\cdot\tau_r},$$

wherein s is a frequency transform, $\tau_r$ is the rotor time constant, and k is a nonzero constant.

4. The method of claim 1, the method further resetting the LPF to an input value in response to a delayed torque change pulse.

5. The method of claim 1, the method further determining the torque relative variation from an integral of the torque error multiplied by a constant gain.

6. The method of claim 5, the method further resetting the integral of the torque error to zero in response to a magnitude of the torque error being less than an error threshold.

7. The method of claim 1, wherein the torque increase pulse is determined in response to both the torque relative variation exceeding the increase threshold and detecting an upward turning corner of the torque reference.

8. The method of claim 1, wherein a torque change pulse is determined in response to detecting a turning corner of the torque reference.

9. The method of claim 1, wherein a torque change pulse is determined in response to one of the torque increase pulse and a torque decrease pulse determined in response to the torque relative variation being less than a decrease threshold.

10. The method of claim 9, wherein the torque decrease pulse is determined in response to both the torque relative variation being less than the decrease threshold and detecting a downward turning corner of the torque reference.

11. The method of claim 1, the method further terminating predicting the change time and terminating increasing the flux current in response to satisfying a termination policy, wherein the termination policy is satisfied in response to the torque increase pulse not appearing in a set time length.

12. The method of claim 11, where the set time length is the change period multiplied by a constant gain larger than 1.

13. An apparatus comprising:
   a plurality of semiconductor gates that:
   determine a torque error from a torque reference modified by a low pass filter function (LPF) of the torque reference, wherein the torque reference is one of measured from an induction machine energized by a flux current and a torque current and calculated in an induction machine controller;
   determine a torque increase pulse in response to a torque relative variation calculated from the torque error exceeding an increase threshold;
   in response to detecting the torque increase pulse, determine a change delay time from the torque relative variation and the torque increase pulse;
   determine a change period from at least two torque increase pulses; and
   increase the flux current before a change time that is predicted as a function of the change delay time and the change period.

14. The apparatus of claim 13, wherein the flux current is increased by advancing a flux current command.

15. The apparatus of claim 13, wherein the LPF implements the transform $$LPF = \frac{k}{1+s\cdot\tau_r},$$

wherein s is a frequency transform, $\tau_r$ is the rotor time constant, and k is a nonzero constant.

16. The apparatus of claim 13, wherein the gates further reset the LPF to an input value in response to a delayed torque change pulse.

17. The apparatus of claim 13, wherein the gates further determine the torque relative variation from an integral of the torque error multiplied by a constant gain.

18. The apparatus of claim 17, wherein the gates further reset the integral of the torque error to zero in response to a magnitude of the torque error being less than an error threshold.

19. The apparatus of claim 13, wherein a torque change pulse is determined in response to detecting a turning corner of the torque reference.

20. A system comprising:
   an induction machine that produces a torque; and
   an induction machine controller that:
   determines a torque error from a torque reference modified by a low pass filter function (LPF) of the torque reference, wherein the torque reference is one of measured from the induction machine energized by a flux current and a torque current and calculated by the induction machine controller;
   determines a torque increase pulse in response to a torque relative variation calculated from the torque error exceeding an increase threshold;
   in response to detecting the torque increase pulse, determines a change delay time from the torque relative variation and the torque increase pulse;
   determines a change period from at least two torque increase pulses; and increases the flux current before a change time that is predicted as a function of the change delay time and the change period.

* * * * *